(12) United States Patent
Ross

(10) Patent No.: US 7,681,754 B1
(45) Date of Patent: Mar. 23, 2010

(54) THERMOS WITH BEVERAGE CONSUMPTION APPARATUS WHICH ENABLES LIQUID TO BE CONSUMED DIRECTLY FROM THE THERMOS WHEN A VALVE IS OPENED

(76) Inventor: Gary Ross, 167 Lambert St., Oxnard, CA (US) 93030

( * ) Notice: Subject to any disclaimer, the term of this patent is extended or adjusted under 35 U.S.C. 154(b) by 1119 days.

(21) Appl. No.: 11/323,723

(22) Filed: Dec. 29, 2005

(51) Int. Cl.
 *A47G 19/22* (2006.01)
 *B67D 3/00* (2006.01)
 *B65D 83/00* (2006.01)

(52) U.S. Cl. ............... 220/714; 220/718; 220/719; 220/254.9; 220/715; 222/554; 222/525; 215/387

(58) Field of Classification Search ............... 220/714, 220/715, 717–719, 254.9, 254.1; 222/554, 222/544, 546, 522–525, 547; 215/387
See application file for complete search history.

(56) References Cited

U.S. PATENT DOCUMENTS

| | | | |
|---|---|---|---|
| 4,960,218 A * | 10/1990 | Toida et al. ................. | 215/311 |
| 6,202,877 B1 * | 3/2001 | La Torre et al. .......... | 220/254.1 |
| 6,662,978 B2 * | 12/2003 | Lin et al. .................... | 222/509 |
| 6,702,138 B1 * | 3/2004 | Bielecki et al. .......... | 220/254.9 |

* cited by examiner

*Primary Examiner*—Robin Hylton
(74) *Attorney, Agent, or Firm*—Thomas I. Rozsa

(57) ABSTRACT

A thermos (with or without a vacuum) with an improved beverage consumption apparatus which enables a liquid to be consumed directly from the thermos when a valve is pushed to the opened condition so that liquid can exit the interior of the thermos. Thermos also contains an improved larger easily locatable circumferential closing ring which facilitates closure of the container when the user is in a darkened area or driving a moving vehicle so that the consumer must have one hand on the steering wheel and is not necessarily looking at the thermos. The thermos also comprises an improved sealing cap to facilitate valve closure. The thermos also contains an improved valve sealing means to assure that even a tiny amount of liquid will not seep out of the thermos when the thermos is placed into a container such as a briefcase which contains written material and valuable electronic objects.

19 Claims, 3 Drawing Sheets

THERMOS WITH BEVERAGE CONSUMPTION APPARATUS WHICH ENABLES LIQUID TO BE CONSUMED DIRECTLY FROM THE THERMOS WHEN A VALVE IS OPENED

BACKGROUND OF THE INVENTION

1. Field of the Invention

The present invention relates to the field of thermoses. A thermos is a container for keeping liquids at almost their original temperature for several hours. The thermos has two walls enclosing a vacuum and is fitted in a metal or plastic outer case. Some thermoses do not have a vacuum. For purposes of the present invention, a thermos is defined to include all types of thermoses including those that have a vacuum and those that do not have a vacuum.

2. Description of the Prior Art

Thermoses have been in existence for many years. In general, a thermos either has no cap or is fitted with a cap which is screwed in place on the upper body of the thermos when the thermos is in the closed condition. In the prior art, when the user desires to consume a beverage which is contained within the thermos, a valve is opened and if the thermos has no cap then liquid is poured into a separate cup or glass. If the thermos has a cap, the cap is unscrewed and functions as a cup. Liquid is poured from the thermos into the cap and consumed. This functions well when the user is seated at a table or adjacent another flat surface when the cap or separate cup can be placed on the flat surface and the beverage from the thermos poured into the cap or separate cup. However, when the user is in a moving vehicle such as a car or public transportation vehicle such as a bus, train or airplane, it becomes more difficult to hold the cap or cup in one hand and pour liquid from the thermos into the cap or cup with the other hand while the vehicle is in motion. In addition, if the person is driving the vehicle, it becomes extremely difficult to pour liquid from the thermos into the cap or cup while driving the vehicle. In addition, if it is night-time and darkness surrounds the vehicle, the difficulty of the process is greatly increased. Therefore, there is a significant need for an improved thermos which facilitates easy consumption of the liquid, especially if the user is in a moving vehicle.

One type of thermos which is known in the prior art has a central pushbutton valve assembly which causes the thermos to be in the open condition when the button is pushed to a downward position, thereby enabling liquid to be poured from the thermos. The thermos has a small circumferential ring which surrounds the button and when a downward force is exerted on the small circumferential ring, the valve assembly is moved to a closed position so that liquid no longer can be poured from the thermos. When the user is in a lighted area, the small circumferential ring is readily visible and can be easily pushed to close the valve. However, when the consumer is in a vehicle when the light is dimmed, especially if the user is driving the vehicle, it becomes more difficult to locate the small circumferential ring to close the valve on the thermos. Therefore, there is a significant need for an improved closure means to close the valve on the thermos when the user is in a darkened area and especially if the darkened area is in a moving vehicle. This problem is compounded if the user is driving the vehicle and therefore must have at least one hand on the steering wheel.

Finally, the user sometimes wishes to place the thermos in the user's briefcase which contains paper and other valuable objects such as a laptop computer. Even though the valve known in the prior art does close the thermos, there is sometimes a small amount of liquid trapped within the interior of the valve which could leak out into the briefcase and potentially damage the written document or laptop computer also contained within the briefcase. Therefore, there is a significant need for an improved valve assembly which assures that even the smallest amount of liquid will not seep out of the thermos when it is laid horizontally within a briefcase or other carrying case which contains written documents and valuable electronic accessories.

SUMMARY OF THE INVENTION

The present invention is a thermos (with or without a vacuum) with an improved beverage consumption apparatus which enables a liquid to be consumed directly from the thermos when a valve is pushed to the opened condition so that liquid can exit the interior of the thermos. The present invention thermos also contains an improved larger easily locatable circumferential closing ring which facilitates closure of the container when the user is in a darkened area or driving a moving vehicle so that the consumer must have one hand on the steering wheel and is not necessarily looking at the thermos. The present invention also comprises an improved sealing cap to facilitate valve closure. The present invention also contains an improved valve sealing means to assure that even a tiny amount of liquid will not seep out of the thermos when the thermos is placed into a container such as a briefcase which contains written material and valuable electronic objects.

It has been discovered, according to the present invention that if the exterior circumferential sidewall of the thermos is extended to a level above the surface of the top of the closing valve, then when the valve is in the opened condition and liquid can be caused to exit the retaining chamber in the thermos, the liquid will be retained by the extended exterior circumferential sidewall and can be consumed directly from the thermos when the user places his/her lips over the extended circumferential sidewall and sips the liquid.

It has further been discovered, according to the present invention, that if the circumferential closing ring which surrounds the pushbutton valve opening means of the thermos is expanded and has a widened surface area, then it is much easier for a user to exert a downward force on the circumferential closing ring to more easily close the valve of the thermos when the user is in a darkened area or driving a moving vehicle.

It has also been discovered, according to the present invention, that if the thermos includes a sealing cap which can be placed into the area surrounded by the extended circumferential sidewall and the sealing cap has an interior downwardly extending ring, then the ring can come in contact with the widened surface area of the circumferential closing ring to exert a downward force thereon and thereby close the valve assembly of the thermos when the cap is placed into the area, either by being threaded into the area with mating threads on the exterior surface of the sealing cap and the interior surface of the extended circumferential sidewall or by being press fitted and pushed therein.

In addition, it has been discovered that if the widen circumferential closing ring further comprises a multiplicity of small bumps or protrusions, when the sealing cap is screwed into or press fit into the thermos, the interior ring within the cap which is aligned with the multiplicity of protrusions can contact the multiplicity of protrusions and thereby facilitate the downward force on the widened circumferential closing ring to close the valve.

It has also been discovered, according to the present invention, that if the valve of the thermos is supplied with additional sealing gaskets within the interior of the valve, then when the valve is in the closed condition, it completely seals the interior chamber of the thermos and seals any liquid which may remain within the valve so that when the thermos is placed into a briefcase or other container having paper material and electronic products therein, the user can be assured that no liquid, not even the liquid which may be trapped within the valve, will seep out of the thermos and possibly ruin the written material or electronic equipment.

It is therefore an object of the present to provide an extended exterior circumferential sidewall of the thermos which is extended to a level above the surface of the top of the closing valve, so that when the valve is in the opened condition and liquid can be caused to exit the retaining chamber in the thermos, the liquid will be retained by the extended exterior circumferential sidewall and can be consumed directly from the thermos when the user places his/her lips over the extended circumferential sidewall and sips the liquid.

It is a further object of the present invention to provide a widened circumferential closing ring which surrounds the pushbutton valve opening means of the thermos which is expanded and has a widened surface area, so that it is much easier for a user to exert a downward force on the circumferential closing ring to more easily close the valve of the thermos when the user is in a darkened area or driving a moving vehicle.

It is additionally an object of the present invention to provide a sealing cap which can be placed into the area surrounded by the extended circumferential sidewall and further providing the sealing cap with an interior downwardly extending ring, so that the ring can come in contact with the widened surface area of the circumferential closing ring to exert a downward force thereon and thereby close the valve assembly of the thermos when the cap is placed into the area, either by being threaded into the area with mating threads on the exterior surface of the sealing cap and the interior surface of the extended circumferential sidewall or by being press fitted and pushed therein.

It is an additional object of the present invention to provide a multiplicity of small bumps or protrusions on the widened circumferential area which are aligned with the interior ring on the thermos sealing cap so that when the sealing cap is screwed into or press fit into the thermos, the interior ring within the cap which is aligned with the multiplicity of protrusions can contact the multiplicity of protrusions and thereby facilitate the downward force on the widened circumferential closing ring to close the valve.

It is also a object of the present invention to provide additional interior sealing gaskets within the interior of the valve so that when the valve is in the closed condition, it completely seals the interior chamber of the thermos and seals any liquid which may remain within the valve so that when the thermos is placed into a briefcase or other container having paper material and electronic products therein, the user can be assured that no liquid, not even the liquid which may be trapped within the valve, will seep out of the thermos and possibly ruin the written material or electronic equipment.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
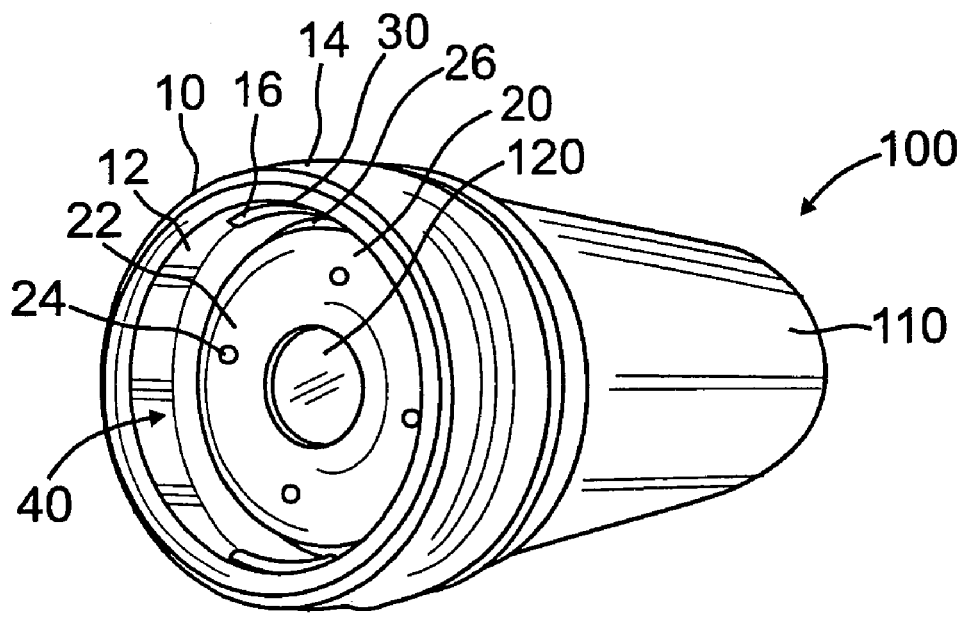
FIG. 1 is a top perspective view of the present invention improved thermos with the pushbutton central valve in the up or closed condition, illustrating the widened circumferential closing ring with protrusions surrounding the pushbutton, and the extended circumferential sidewall which extends above the level of the central pushbutton and the widened circumferential closing ring.
Figure 2:
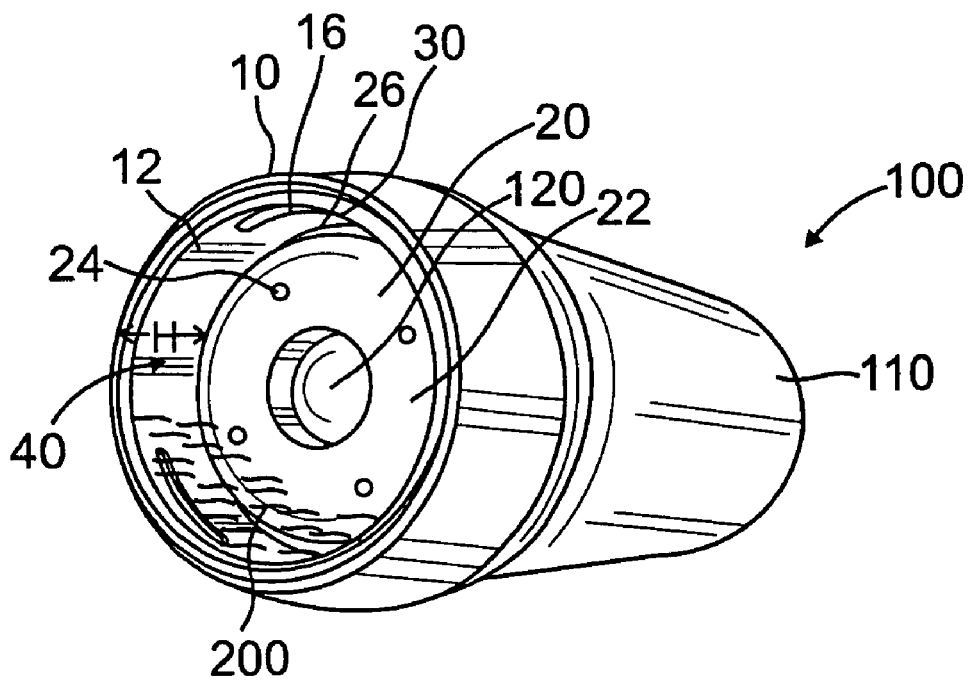
FIG. 2 is a top perspective view of the present invention improved thermos with the pushbutton central valve in the down or opened condition, illustrating the widened circumferential closing ring with protrusions surrounding the pushbutton, and the extended circumferential sidewall which extends above the level of the central pushbutton and the widened circumferential closing ring.

Referring to the top perspective views of FIGS. 1 and 2, there is illustrated a thermos 100 which incorporates the novel features of the present invention. The thermos 100 has a circumferential sidewall 110 which contains within it a central chamber for retaining a liquid. The thermos may have two walls enclosing a vacuum which is of conventional design well known in the prior art. The thermos may also have no vacuum which is also of conventional design well known in the prior art. The thermos 100 is also fitted with a conventional valve assembly illustrated in FIGS. 5 and 6 which terminate in a central activation pushbutton 120. In FIG. 1, the central activation pushbutton is illustrated in the up or valve closed position. In FIG. 2, the central activation pushbutton is illustrated in the down or valve opened condition.

In conventional thermoses, the height of the sidewall terminates at approximately the level of the pushbutton in the up position. One key innovation of the present invention is to extend the height of the sidewall so that the extended sidewall 10 extends to a height above the level of the pushbutton 120 in the up or closed condition so that an interior chamber 40 is formed within the interior surface 12 of the extended sidewall 10. The extended sidewall 10 also has an exterior surface 14. The interior surface 12 of the extended sidewall 10 may also comprise threads 16.

A second key innovation of the present invention is the creation of a widened circumferential closing ring 20. In conventional thermoses, the circumferential closing ring is narrow. An innovation of the present invention is to create a widened circumferential closing ring 20 as illustrated in FIGS. 1 and 2. The widened circumferential closing ring 20 has a top surface 22 which supports a multiplicity of protrusions 24. It will be appreciated that it is within the spirit and scope of the present invention for the top surface 22 to have at least one protrusion 24 or no protrusion at all. The widened circumferential closing ring 20 extends from adjacent the central activation pushbutton 120 to adjacent the interior surface 12 of extended sidewall 10. There is a small circumferential gap 30 between the exterior circumference 26 of widened circumferential closing ring 20 and the interior surface 12 of extended sidewall 10 so that liquid 200 can flow from the interior chamber of the thermos into the cavity 40 formed by the interior surface 12 of extended sidewall 10 and the top 22 of the circumferential closing ring 20.

Therefore, a user can place his or her lips around the extended circumferential sidewall 10 and drink the liquid 200 directly from the formed chamber 40 of the thermos. This is a key innovation. As discussed in the background section, prior art conventional thermoses either have no cap so that liquid is poured from the thermos into a separate glass or cup or in the embodiment where a cap is screwed onto the thermos, the cap serves as a cup into which the liquid is poured. In a situation where the user is in a moving vehicle, especially when it is dark at night or very early in the morning, it is very difficult to hold a cup steady and pour liquid from the thermos into the cup. The present invention completely solves this problem. It is not necessary to pour the liquid form the thermos into any cap, cup or glass. Instead, once the activation pushbutton 120 is pushed into the down or opened position, the liquid 200 flows through the circumferential gap 26 into the chamber 40 and the user can drink the liquid directly from the present invention improved thermos. As a result, there will be no spillage of liquid during a pouring process. This is extremely beneficial, especially if the liquid 200 is very hot coffee or tea.

Figure 3:
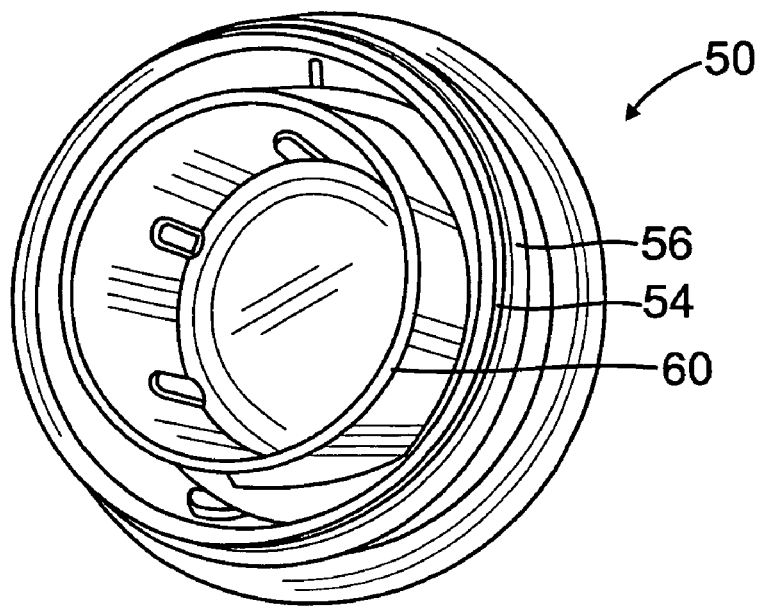
FIG. 3 is a bottom perspective view of the sealing cap of the thermos, illustrating the downwardly extending interior ring.
Figure 4:
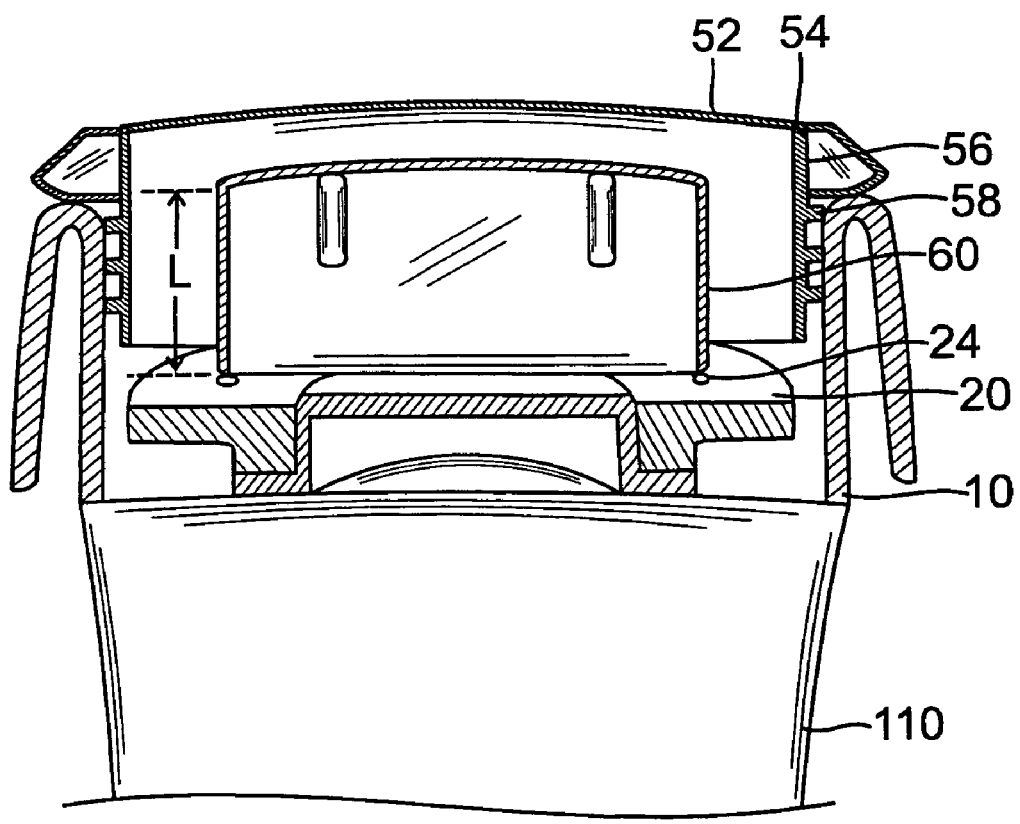
FIG. 4 is a cross-sectional view of the sealing cap screwed into the upper portion of the thermos and illustrating the downwardly extending interior ring aligned with two of the protrusions on the circumferential closing ring.
Figure 6:
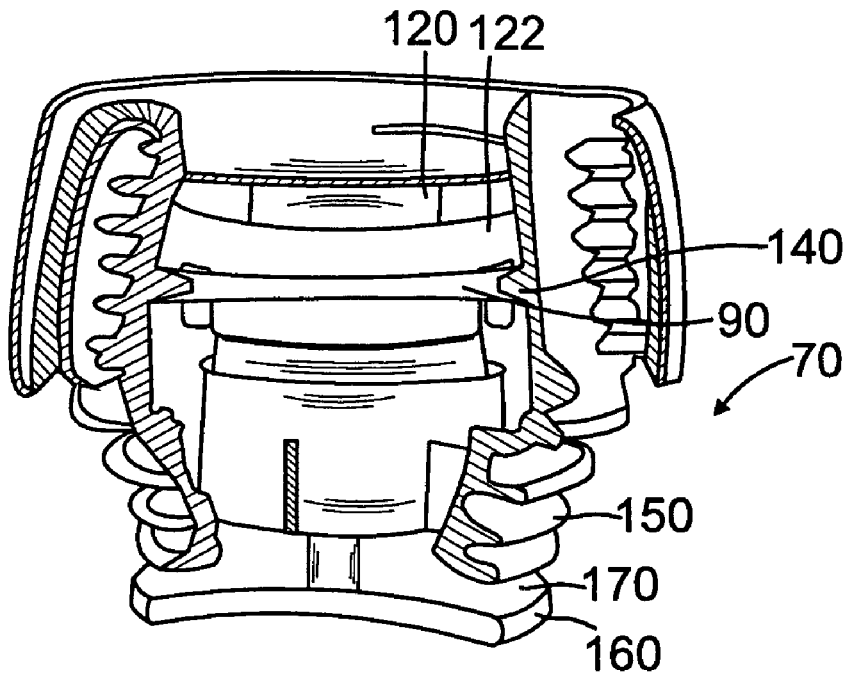
FIG. 6 is a partial cross-section view of the pushbutton valve of a thermos incorporating a second embodiment of the present invention additional interior sealing gasket within the valve.

The benefit of the protrusions 24 is illustrated in FIGS. 3 and 4. The present invention includes a sealing cap 50 which has a top surface 52 and a sidewall 54 which has an exterior surface 56 which may have with threads 58 formed on the exterior surface 56. The threads 58 mate with the threads 16 on extended circumferential sidewall 10 when the sealing cap is screwed into the extended circumferential sidewall 10. The sealing cap 50 also has a central downwardly extending interior ring 60. As illustrated in FIG. 6, when the sealing cap 50 is screwed into the upper extended circumferential sidewall 10, the downwardly extending interior ring 60 contacts at least one protrusion 24 and thereby exerts a downward force on the widened circumferential closing ring 20 to cause the valve assembly 70 to close. It will be appreciated that even without the protrusion 24, if the downwardly extending circumferential ring 60 has a length "L" which matches the interior height "H" of the extended circumferential sidewall 10, there will be a downward force exerted on the widened circumferential closing ring 20 so that the valve 70 will be closed.

If it is dark and the sealing cap 50 cannot be easily located, the widened circumferential closing ring 20 permits a user to easily press down on it to close the valve assembly 70. Therefore, the widened circumferential closing ring 20 by itself provides a significant benefit to a user by enabling the user to easily close the valve and shut off the flow of beverage when it is dark.

Figure 5:
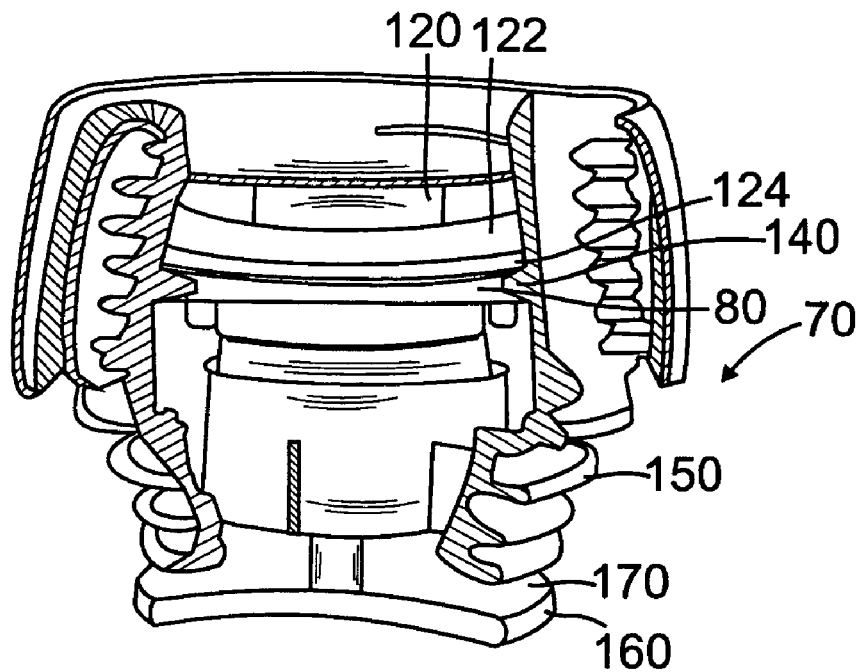
FIG. 5 is a partial cross-section view of the pushbutton valve of a thermos incorporating a first embodiment of the present invention additional interior sealing gasket within the valve.

The valve assembly 70 is illustrated in FIGS. 5 and 6. The activation pushbutton 120 extends into a widened plate 122 which mates with a circumferential interior shelf 140 on the interior wall 132 of valve body 130. The valve body 130 has a circumferential exterior sidewall 150 which terminates in a plate 160. In the closed condition, the plate 160 lies flush against the sidewall 150 so that no liquid can flow through the valve. In the open condition illustrated in FIGS. 5 and 6, the plate 160 is pushed away from the sidewall so that a gap 170 is created so that liquid from the thermos can flow through the valve 70 and into a gap 30 between the interior surface 12 of the extended sidewall 10 and the exterior circumference 26 of widened circumferential closing ring 20. It will be appreciated that other components such as springs in the conventional valve assembly have not been illustrated.

The innovation of the present invention is to include an additional sealing gasket within the valve assembly 70 to absolutely assure that no liquid which was trapped in the valve assembly when it is closed will accidentally seep out of the valve assembly and into an enclosure such as a briefcase where the thermos with liquid therein has been stored. In the first embodiment illustrated in FIG. 5, the additional sealing gasket 80 is affixed to the lower circumferential surface 124 of the widened plate portion 122 of activation pushbutton 120. The gasket 80 is aligned with the circumferential interior shelf 140. When in the closed condition this additional gasket 80 provides a double safe sealing arrangement to assure that no liquid trapped within the valve assembly 70 will seep out of the thermos.

The alternative embodiment of the sealing gasket 90 is illustrated in FIG. 6. In this embodiment, the additional interior sealing gasket 90 is affixed to the interior shelf 140 so that it is compressed between the interior shelf 140 and the widened plate 122 when the valve is in the closed condition, to once again provide a double safe sealing arrangement to assure that no liquid trapped within the valve assembly 70 will seep out of the thermos.

Defined in detail, the present invention is a thermos having an internal chamber for retaining a liquid and fitted within a thermos sidewall, and a valve assembly in fluid communication with the internal chamber, the valve assembly having an opened condition by which a liquid can be dispensed from the thermos and a closed condition which prevents the liquid from being dispensed from the thermos, the valve assembly positioned at one end of the thermos and having a central activation pushbutton by which the valve is opened, the improvement comprising: (a) an extended sidewall extending from the sidewall at the end of the thermos containing the valve assembly, the extended sidewall having an interior surface and an exterior surface such that the interior surface of the extended sidewall forms a sidewall of a chamber above the valve assembly; (b) a widened circumferential closing ring by which the valve is closed and having a widened top surface surrounding an upper portion of and extending from the central activation pushbutton to a location adjacent the interior surface of the extended sidewall, a gap located between the interior surface of the extended sidewall and the exterior circumference of the widened circumferential closing ring; (c) a downward force on the widened circumferential closing ring causing the valve assembly to close with the widened surface area facilitating manual closure of the valve assembly; and (d) the widened top surface of the widened circumferential valve closing assembly forming the base of the chamber bounded by the interior surface of the extended sidewall, the chamber serving to retain a liquid which flows out of the thermos when the valve is in the opened condition, the extended sidewall enabling a user to sip the liquid from the chamber.

Defined more broadly, the present invention is a thermos having an internal chamber for retaining a liquid, the internal chamber and fitted within a thermos sidewall and a valve assembly in fluid communication with the internal chamber, the valve assembly having an opened condition by which a liquid can be dispensed from the thermos and a closed condition which prevents the liquid from being dispensed from the thermos, the valve assembly positioned at one end of the thermos and having a central activation pushbutton by which the valve is opened, the improvement comprising: (a) an extended sidewall extending from the sidewall at the end of the thermos containing the valve assembly, the extended sidewall having an interior surface and an exterior surface such that the interior surface of the extended sidewall forms a sidewall of a chamber above the valve assembly; and (b) the chamber bounded by the interior surface of the extended sidewall, serving to retain a liquid which flows out of the thermos when the valve is in the opened condition, the extended sidewall enabling a user to sip the liquid from the chamber.

Defined alternatively and more broadly, the present invention is a thermos having an internal chamber for retaining a liquid, the internal chamber and fitted within a thermos sidewall and a valve assembly in fluid communication with the internal chamber, the valve assembly having an opened condition by which a liquid can be dispensed from the thermos and a closed condition which prevents the liquid from being dispensed from the thermos, the valve assembly positioned at one end of the thermos and having a central activation pushbutton by which the valve is opened, the improvement comprising: (a) a widened circumferential closing ring by which the valve is closed and having a widened top surface surrounding an upper portion of and extending around a top portion of the central activation pushbutton; and (b) a downward force on the widened circumferential closing ring causing the valve assembly to close with the widened surface area facilitating manual closure of the valve assembly.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A thermos having an internal chamber for retaining a liquid and fitted within a thermos sidewall and a valve assembly in fluid communication with the internal chamber, the valve assembly having an opened condition by which a liquid can be dispensed from the thermos and a closed condition which prevents the liquid from being dispensed from the thermos, the valve assembly positioned at one end of the thermos and having a central activation pushbutton by which the valve is opened, the improvement comprising:

a. an extended sidewall extending from the sidewall at the end of the thermos containing the valve assembly, the extended sidewall having an interior surface and an exterior surface such that the interior surface of the extended sidewall forms a sidewall of a chamber above the valve assembly;

b. a widened circumferential closing ring by which the valve is closed and having a top surface surrounding an upper portion of and extending from the central activation pushbutton to a location adjacent the interior surface of the extended sidewall, a gap located between the interior surface of the extended sidewall and the exterior circumference of the widened circumferential closing ring;

c. a downward force on the widened circumferential closing ring causing the valve assembly to close with the widened circumferential closing ring facilitating manual closure of the valve assembly; and d. the top surface of the widened circumferential closing ring forming the base of a chamber bounded by the interior surface of the extended sidewall, the chamber serving to retain a liquid which flows out of the thermos when the valve is in the opened condition, the extended sidewall enabling a user to sip the liquid from the chamber.

2. The thermos in accordance with claim 1, further comprising a sealing cap having means to fit within the chamber and be retained therein, the sealing cap having an extending internal ring which comes in contact with the top surface of the widened circumferential closing ring to create a downward force thereon and close the valve when the sealing cap is within the chamber.

3. The thermos in accordance with claim 2 further comprising threads on the internal surface of the extended sidewall and mating threads on an exterior surface of the sealing cap wherein the sealing cap is retained within the chamber by being threaded into the internal surface of the extended sidewall.

4. The thermos in accordance with claim 2 wherein the sealing cap is retained within the chamber by a press fit.

5. The thermos in accordance with claim 2 further comprising a multiplicity of protrusions on the top surface of the widened circumferential closing ring, the protrusions aligned with the extending interior ring of the sealing cap whereby the protrusions facilitate the closing of the valve when the sealing cap is retained within the chamber.

6. The thermos in accordance with claim 2 further comprising at least one protrusion on the top surface of the widened circumferential closing ring, the at least one protrusion aligned with the extending interior ring of the sealing cap whereby the at least one protrusion facilitate the closing of the valve when the sealing cap is retained within the chamber.

7. The thermos in accordance with claim 1 wherein the valve assembly further comprises a widened plate extending from the activation pushbutton and a mating shelf located on an interior wall of a valve body of the valve, and a sealing gasket affixed to a lower wall of the widened plate such that the sealing gasket is sandwiched between the widened plate and the shelf when the valve is in the closed position to assure that any liquid trapped within the valve will not seep out of the thermos.

8. The thermos in accordance with claim 1 wherein the valve assembly further comprises a widened plate extending from the activation pushbutton and a mating shelf located on an interior wall of a valve body of the valve, and a sealing gasket affixed to the shelf such that the sealing gasket is sandwiched between the widened plate and the shelf when the valve is in the closed position to assure that any liquid trapped within the valve will not seep out of the thermos.

9. A thermos having an internal chamber for retaining a liquid and fitted within a thermos sidewall and a valve assembly in fluid communication with the internal chamber, the valve assembly having an opened condition by which a liquid can be dispensed from the thermos and a closed condition which prevents the liquid from being dispensed from the thermos, the valve assembly positioned at one end of the thermos and having a central activation pushbutton by which the valve is opened, the improvement comprising:
  a. an extended sidewall extending from the sidewall at the end of the thermos containing the valve assembly, the extended sidewall having an interior surface and an exterior surface such that the interior surface of the extended sidewall forms a sidewall of a chamber above the valve assembly;
  b. the chamber bounded by the interior surface of the extended sidewall, serving to retain a liquid which flows out of the thermos when the valve is in the opened condition, the extended sidewall enabling a user to sip the liquid from the chamber;
  c. a widened circumferential closing ring by which the valve is closed and having a top surface surrounding an upper portion of and extending from the central activation pushbutton to a location adjacent the interior surface of the extended sidewall, a gap located between the interior surface of the extended sidewall and the exterior circumference of the widened circumferential closing ring;
  d. a downward force on the widened circumferential closing ring causing the valve assembly to close and facilitating manual closure of the valve assembly; and
  e. the top surface of the widened circumferential closing ring forming the base of the chamber bounded by the interior surface of the extended sidewall, the chamber serving to retain a liquid which flows out of the thermos when the valve is in the opened condition, the extended sidewall enabling a user to sip the liquid from the chamber.

10. The thermos in accordance with claim 9, further comprising a sealing cap having means to fit within the chamber and be retained therein, the sealing cap having an extending internal ring which comes in contact with the top surface of the widened circumferential closing ring to create a downward force thereon and close the valve when the sealing cap is within the chamber.

11. The thermos in accordance with claim 10 further comprising threads on the internal surface of the extended sidewall and mating threads on an exterior surface of the sealing cap wherein the sealing cap is retained within the chamber by being threaded into the internal surface of the extended sidewall.

12. The thermos in accordance with claim 10 wherein the sealing cap is retained within the chamber by a press fit.

13. The thermos in accordance with claim 10 further comprising a multiplicity of protrusions on the top surface of the widened circumferential closing ring, the protrusions aligned with the extending interior ring of the sealing cap whereby the protrusions facilitate the closing of the valve when the sealing cap is retained within the chamber.

14. The thermos in accordance with claim 10 further comprising at least one protrusion on the top surface of the widened circumferential closing ring, the at least one protrusion aligned with the extending interior ring of the sealing cap whereby the at least one protrusion facilitate the closing of the valve when the sealing cap is retained within the chamber.

15. The thermos in accordance with claim 9 wherein the valve assembly further comprises a widened plate extending from the activation pushbutton and a mating shelf located on an interior wall of a valve body of the valve, and a sealing gasket affixed to a lower wall of the widened plate such that the sealing gasket is sandwiched between the widened plate and the shelf when the valve is in the closed position to assure that any liquid trapped within the valve will not seep out of the thermos.

16. The thermos in accordance with claim 9 wherein the valve assembly further comprises a widened plate extending from the activation pushbutton and a mating shelf located on an interior wall of a valve body of the valve, and a sealing gasket affixed to the shelf such that the sealing gasket is sandwiched between the widened plate and the shelf when the valve is in the closed position to assure that any liquid trapped within the valve will not seep out of the thermos.

17. A thermos having an internal chamber for retaining a liquid and fitted within a thermos sidewall and a valve assembly in fluid communication with the internal chamber, the valve assembly having an opened condition by which a liquid can be dispensed from the thermos and a closed condition which prevents the liquid from being dispensed from the thermos, the valve assembly positioned at one end of the thermos and having a central activation pushbutton by which the valve is opened, the improvement comprising:
  a. a widened circumferential closing ring by which the valve is closed and having a widened top surface surrounding an upper portion of and extending around a top portion of the central activation pushbutton; and
  b. a downward force on the widened circumferential closing ring causing the valve assembly to close with the widened surface area facilitating manual closure of the valve assembly.

18. The thermos in accordance with claim 17 wherein the valve assembly further comprises a widened plate extending from the activation pushbutton and a mating shelf located on an interior wall of a valve body of the valve, and a sealing gasket affixed to a lower wall of the widened plate such that the sealing gasket is sandwiched between the widened plate and the shelf when the valve is in the closed position to assure that any liquid trapped within the valve will not seep out of the thermos.

19. The thermos in accordance with claim 17 wherein the valve assembly further comprises a widened plate extending from the activation pushbutton and a mating shelf located on an interior wall of a valve body of the valve, and a sealing gasket affixed to the shelf such that the sealing gasket is sandwiched between the widened plate and the shelf when the valve is in the closed position to assure that any liquid trapped within the valve will not seep out of the thermos.

* * * * *